(12) United States Patent
Martin et al.

(10) Patent No.: US 10,151,233 B2
(45) Date of Patent: *Dec. 11, 2018

(54) METHOD AND SYSTEM FOR MAINTAINING AN ENGINE COOLANT LEVEL

(71) Applicant: Ford Global Technologies, LLC, Dearborn, MI (US)

(72) Inventors: Douglas Raymond Martin, Canton, MI (US); John Eric Rollinger, Troy, MI (US); Kenneth James Miller, Canton, MI (US); Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/025,073

(22) Filed: Jul. 2, 2018

(65) Prior Publication Data

US 2018/0320578 A1 Nov. 8, 2018

Related U.S. Application Data

(63) Continuation of application No. 15/431,187, filed on Feb. 13, 2017, now Pat. No. 10,012,133.

(51) Int. Cl.
*F01P 11/02* (2006.01)
*F02B 29/04* (2006.01)
(Continued)

(52) U.S. Cl.
CPC ...... *F01P 11/0204* (2013.01); *B60H 1/00735* (2013.01); *B60H 1/00978* (2013.01);
(Continued)

(58) Field of Classification Search
CPC .......... F01P 11/0204; F01P 5/10; F01P 11/04; F01P 7/14; F01P 11/18; F01P 3/20;
(Continued)

(56) References Cited

U.S. PATENT DOCUMENTS

| 5,435,151 A | 7/1995 | Han |
| 6,058,718 A | 5/2000 | Forsberg et al. |

(Continued)

FOREIGN PATENT DOCUMENTS

| EP | 1354856 A1 | 10/2003 |
| JP | H02172587 A | 7/1990 |

(Continued)

*Primary Examiner* — Hung Q Nguyen
*Assistant Examiner* — Xiao Mo
(74) *Attorney, Agent, or Firm* — Julia Voutyras; McCoy Russell LLP

(57) ABSTRACT

Methods and systems are provided for maintaining a desired engine coolant level and a relative glycol amount in the engine coolant by using water sourced from on-board vehicle systems. In one example, a method may include supplying water to the engine coolant reservoir in response to the engine coolant level decreasing below a threshold. Also, a relative glycol amount in the coolant may be maintained at a threshold amount by adding water to the coolant in response to a relative glycol increasing above the threshold.

20 Claims, 3 Drawing Sheets

(51) Int. Cl.
*F02M 26/23* (2016.01)
*B60H 1/00* (2006.01)
*F01P 11/18* (2006.01)
*F01P 11/04* (2006.01)
*F01P 5/10* (2006.01)
*F01P 3/20* (2006.01)
*F01P 7/14* (2006.01)

(52) U.S. Cl.
CPC .................. *F01P 3/20* (2013.01); *F01P 5/10* (2013.01); *F01P 7/14* (2013.01); *F01P 11/04* (2013.01); *F01P 11/18* (2013.01); *F02B 29/0468* (2013.01); *F02M 26/23* (2016.02); *F01P 2007/146* (2013.01); *F01P 2023/08* (2013.01); *F01P 2025/00* (2013.01)

(58) Field of Classification Search
CPC ............... F01P 2023/08; F01P 2025/00; F01P 2007/146; B60H 1/00735; B60H 1/00978; F02M 26/23; F02B 29/0468
See application file for complete search history.

(56) References Cited

U.S. PATENT DOCUMENTS

| | | | |
|---|---|---|---|
| 6,171,718 | B1 | 1/2001 | Murach et al. |
| 6,182,453 | B1 | 2/2001 | Forsberg |
| 6,684,648 | B2 | 2/2004 | Faqih |
| 8,252,174 | B2 | 8/2012 | Jones et al. |
| 2002/0070124 | A1* | 6/2002 | Andrews ................. C25B 15/08 205/628 |
| 2002/0148221 | A1* | 10/2002 | Jagtoyen ............. B01D 53/265 60/309 |
| 2012/0221198 | A1 | 8/2012 | Kohavi et al. |
| 2012/0247135 | A1 | 10/2012 | Fakieh |
| 2016/0083936 | A1 | 3/2016 | Martin et al. |

FOREIGN PATENT DOCUMENTS

| | | |
|---|---|---|
| WO | 02059043 A2 | 8/2002 |
| WO | 2004020919 A1 | 3/2004 |
| WO | 2009073134 A1 | 6/2009 |

* cited by examiner

METHOD AND SYSTEM FOR MAINTAINING AN ENGINE COOLANT LEVEL

CROSS REFERENCE TO RELATED APPLICATION

The present application is a continuation of U.S. patent application Ser. No. 15/431,187, entitled "METHOD AND SYSTEM FOR MAINTAINING AN ENGINE COOLANT LEVEL," filed on Feb. 13, 2017. The entire contents of the above-referenced application are hereby incorporated by reference in its entirety for all purposes.

FIELD

The present description relates generally to methods and systems for maintaining a desired coolant level and a relative glycol amount in an engine coolant, for example by using water recovered from one or more vehicle systems.

BACKGROUND/SUMMARY

In automotive thermal management, coolant level in a cooling system is closely controlled for improved engine efficiency and emissions quality. The coolant may comprise a mixture of water and glycol and a chemical balance between the two components is maintained to improve the performance of the cooling system. As the coolant is circulated through engine components to control engine temperature, over time, due to evaporation, the water content of the coolant may reduce and also there may be an overall reduction in the coolant level and an increase in the coolant glycol level. Also, leakages may cause a decrease in the coolant glycol level.

Various approaches are provided for maintaining the water balance in an engine coolant system. In one example, as shown in U.S. Pat. No. 6,171,718, Murach et al. discloses a method of monitoring coolant level in a coolant reservoir inside a fuel cell used in a vehicle. If the coolant level reduces to below a threshold, the exhaust stream may be routed through a supercharger, wherein the exhaust stream is pressurized. The pressurized exhaust stream is then passed through a pressurized condensing heat exchanger and water is recovered from the pressurized exhaust stream. This recovered water may be used to restore the water level in the coolant.

However, the inventors herein have recognized potential disadvantages with the above approach. As one example, in the approach shown by Murach et al., operating parameters of the fuel cell may have to be adjusted in order to produce condensed water to be added to the coolant system. The change in the operating parameters may adversely affect the operation of the fuel cell and the associated vehicle. Also, in the aforementioned approach, the glycol level in the coolant is not taken into account while adjusting the coolant level. Due to higher coolant temperatures, a significant amount of water in the coolant may evaporate and a higher relative amount of glycol in the coolant may cause over-heating of the coolant thereby adversely affecting performance of the cooling system and the overall engine performance. Further, use of water stored in a reservoir (for coolant system maintenance) which needs to be externally refilled and maintained may add to the maintenance cost of the vehicle.

In one example, the issues described above may be addressed by an engine method comprising: in response to a relative amount of glycol in an engine coolant being higher than a threshold amount, and/or in response to an engine coolant level being lower than a threshold coolant level, supplying water from an on-board water collection system to a coolant reservoir; and in response to the relative amount of glycol in the engine coolant being lower than the threshold amount, setting a diagnostic code. In this way, by monitoring the coolant level and glycol level in a coolant and by opportunistically adding water harvested from one or more vehicle components to the coolant, water glycol balance and the coolant level may be maintained in the coolant system.

As one example, the coolant level in a coolant reservoir may be measured via a float sensor or may be estimated based on a coolant temperature sensor output data. The glycol level in the coolant may be directly measured via a glycol level sensor or estimated from the coolant level in the reservoir. If it is inferred that the relative amount of glycol in the coolant is higher than a threshold and/or if the coolant level in the reservoir is lower than a threshold, an amount of water may be added to the coolant such that the coolant level increases to the threshold level, and the relative glycol amount decreases to the threshold amount. The amount of water to be added may be based on the one or more of a difference between the current coolant level and the threshold and the difference between the actual relative glycol amount and the desired relative glycol amount. The water to be added to the coolant system may be harvested from condensate accumulated in a plurality of vehicle components. As such, a significant amount of water condenses at an evaporator of an air conditioning system and this water may be stored in a reservoir to be opportunistically used to maintain the coolant level. In addition, water may be recovered from vehicle door seal channels, exhaust system, intake system charge air cooler, fuel system, etc. Each of the on-board water recovery systems may have individual reservoirs to collect the water which may then be routed to a centralized water tank via a plurality of pumps and from thereon the water may be supplied to the coolant reservoir based on demand. In addition, the water reservoirs may be coupled to drainage lines to remove any excess water. Before adding the water to the coolant reservoir, the purity of water may also be determined and in response to a lower than threshold water quality, water stored in the tank may be drained. If it is determined that the relative glycol amount in the coolant is lower than the threshold amount, a diagnostic code may be set notifying an operator to externally supply glycol.

In this way, by sourcing water from a plurality of existing vehicle components such as the air conditioning system for use in the coolant system, engine operating conditions may not have to be altered for water recovery. Also, by internally sourcing the water, dependence on external water supply may be reduced which may also reduce the maintenance cost of externally supplying water to the coolant system. By sourcing water from a plurality of vehicle systems, burden on any one particular system may be reduced. The technical effect of estimating the glycol level and adjusting the water level in the coolant order to maintain a desired water glycol balance is that overheating and degradation of the coolant system may be reduced. Also, by assessing the water quality before adding the water to the coolant system, possibility of contamination of the coolant system caused due to excessive glycol content in coolant may be reduced. Overall, by maintaining the chemical balance in the coolant system, engine operation may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
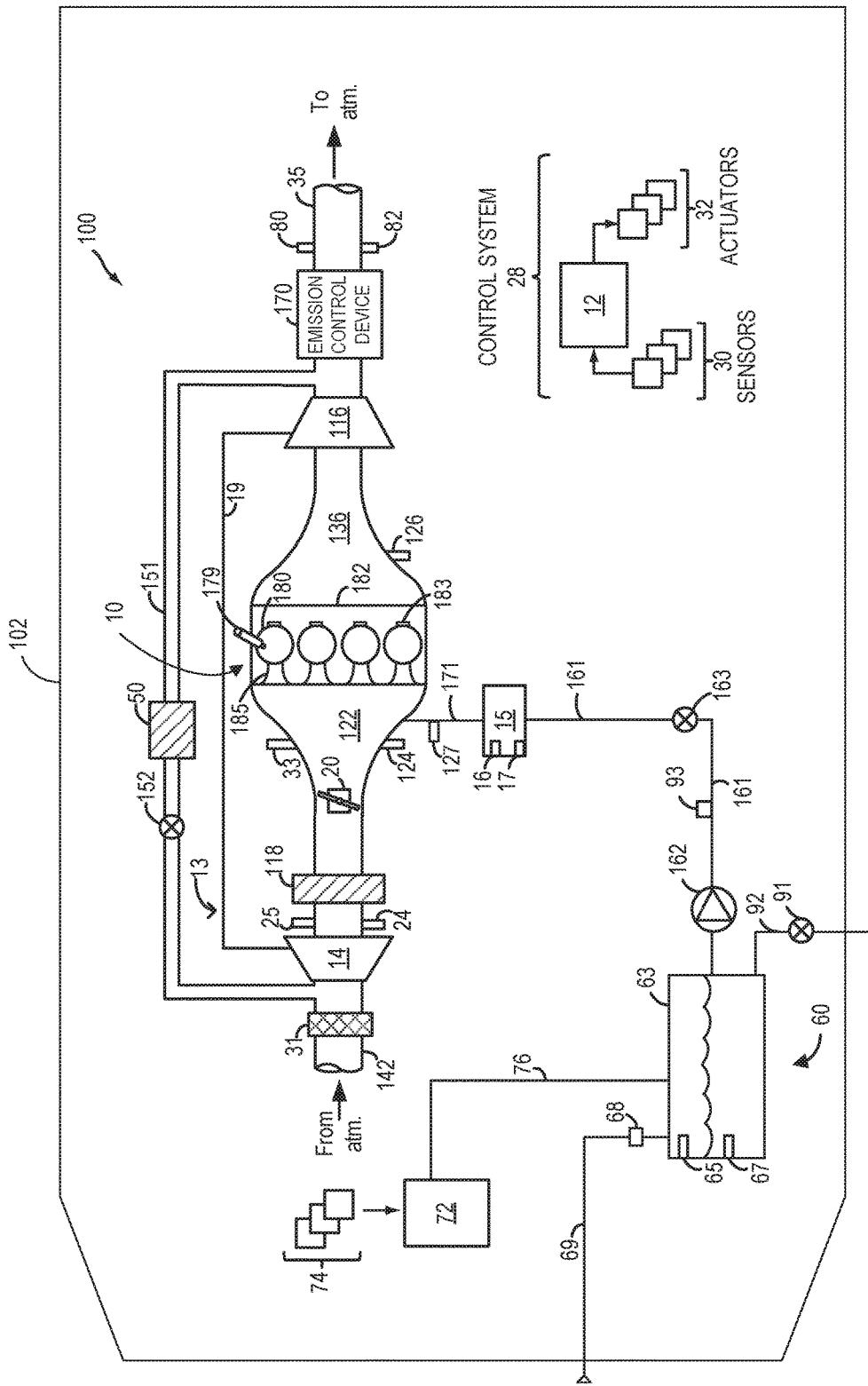
FIG. 1 shows a schematic diagram of an engine system including an on-board water recovery system.

The following description relates to systems and methods for maintaining a coolant level and a water glycol balance in an engine coolant by using water recovered from one or more vehicle systems. An example embodiment of an engine system with a coolant system and an on-board water recovery system is shown in FIG. 1. A controller may be configured to perform a control routine, such as the example routine of FIG. 2, to maintain a desired coolant level and a water glycol balance in the engine coolant system. An example of maintenance of the coolant level and the water glycol chemical balance in the coolant system is shown in FIG. 3.

FIG. 1 shows an example embodiment of an engine system 100 configured with an on-board water recovery system 60. Engine system 100 is coupled in motor vehicle 102, illustrated schematically. Engine system 100 includes an engine 10, depicted herein as a boosted engine coupled to a turbocharger 13 including a compressor 14 driven by a turbine 116. Specifically, fresh air is introduced along intake passage 142 into engine 10 via air cleaner 31 and flows to compressor 14. The compressor may be a suitable intake-air compressor, such as a motor-driven or driveshaft driven supercharger compressor. In the engine system 100, the compressor is shown as a turbocharger compressor mechanically coupled to turbine 116 via a shaft 19, the turbine 116 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

As shown in FIG. 1, compressor 14 is coupled, through charge air cooler (CAC) 118 to throttle valve (e.g., intake throttle) 20. The CAC 118 may be an air-to-air or air-to-coolant heat exchanger, for example. Throttle valve 20 is coupled to engine intake manifold 122. From the compressor 14, the hot compressed air charge enters the inlet of the CAC 118, cools as it travels through the CAC, and then exits to pass through the throttle valve 20 to the intake manifold 122. In the embodiment shown in FIG. 1, the pressure of the air charge within the intake manifold is sensed by manifold absolute pressure (MAP) sensor 124 and a boost pressure is sensed by boost pressure sensor 24. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened responsive to compressor surge.

Intake manifold 122 is coupled to a series of combustion chambers or cylinders 180 through a series of intake valves (not shown) and intake runners (e.g., intake ports) 185. As shown in FIG. 1, the intake manifold 122 is arranged upstream of all combustion chambers 180 of engine 10. Additional sensors, such as manifold charge temperature (MCT) sensor 23 and air charge temperature sensor (ACT) 25 may be included to determine the temperature of intake air at the respective locations in the intake passage. The air temperature may be further used in conjunction with an engine coolant temperature to compute the amount of fuel that is delivered to the engine, for example. Each combustion chamber may further include a knock sensor 183 for identifying and differentiating abnormal combustion events, such as knock and pre-ignition. In alternate embodiments, one or more knock sensors 183 may be coupled to selected locations of the engine block.

The combustion chambers are further coupled to exhaust manifold 136 via a series of exhaust valves (not shown). The combustion chambers 180 are capped by cylinder head 182 and coupled to fuel injectors 179 (while only one fuel injector is shown in FIG. 1, each combustion chamber includes a fuel injector coupled thereto). Fuel may be delivered to fuel injector 179 by a fuel system (not shown) including a fuel tank, a fuel pump, and a fuel rail. Fuel injector 179 may be configured as a direct injector for injecting fuel directly into combustion chamber 180, or as a port injector for injecting fuel into an intake port upstream of an intake valve of the combustion chamber 180.

In the depicted embodiment, a single exhaust manifold 136 is shown. However, in other embodiments, the exhaust manifold may include a plurality of exhaust manifold sections. Configurations having a plurality of exhaust manifold sections may enable effluent from different combustion chambers to be directed to different locations in the engine system. Universal Exhaust Gas Oxygen (UEGO) sensor 126 is shown coupled to exhaust manifold 136 upstream of turbine 116. Alternatively, a two-state exhaust gas oxygen sensor may be substituted for UEGO sensor 126.

As shown in FIG. 1, exhaust from the one or more exhaust manifold sections is directed to turbine 116 to drive the turbine. When reduced turbine torque is desired, some exhaust may be directed instead through a waste gate (not shown), by-passing the turbine. The combined flow from the turbine and the waste gate then flows through emission control device 170. In general, one or more emission control devices 170 may include one or more exhaust after-treatment catalysts configured to catalytically treat the exhaust flow, and thereby reduce an amount of one or more substances in the exhaust flow.

All or part of the treated exhaust from emission control device 170 may be released into the atmosphere via exhaust conduit 35. Depending on operating conditions, however, some exhaust may be diverted instead to an exhaust gas recirculation (EGR) passage 151, through EGR cooler 50 and EGR valve 152, to the inlet of compressor 14. In this manner, the compressor is configured to admit exhaust tapped from downstream of turbine 116. The EGR valve 152 may be opened to admit a controlled amount of cooled exhaust gas to the compressor inlet for desirable combustion and emissions-control performance. In this way, engine system 100 is adapted to provide external, low-pressure (LP) EGR. The rotation of the compressor, in addition to the relatively long LP EGR flow path in engine system 100, provides excellent homogenization of the exhaust gas into the intake air charge. Further, the disposition of EGR take-off and mixing points provides effective cooling of the exhaust gas for increased available EGR mass and increased performance. In other embodiments, the EGR system may be a high pressure EGR system with EGR passage 151 connecting from upstream of the turbine 116 to downstream of the compressor 14. In some embodiments, the MCT sensor 23 may be positioned to determine the manifold charge temperature, and may include air and exhaust recirculated through the EGR passage 151.

The on-board water recovery system 60 may include a water storage tank 63, a water lift pump 162, a collection system 72, and a water filling passage 69. Water stored in water tank 63 is delivered to a reservoir 15 of an engine coolant system via conduits or lines 161. A flow regulator valve 163 may regulate flow of water from the water storage tank 63 to the coolant reservoir 15. The coolant reservoir 15 may include a float sensor 16 and a glycol level sensor 17 to estimate a level of coolant in the coolant reservoir and a relative amount of glycol in the coolant, respectively. Coolant from the coolant reservoir 15 may be circulated through the engine via the coolant line 171. An engine coolant temperature sensor 127 may be coupled to the coolant line 171 to estimate coolant temperature and engine temperature.

Water storage tank 63 may include a water level sensor 65 and a water temperature sensor 67, which may relay information regarding water conditions to controller 12. For example, in freezing conditions, water temperature sensor 67 detects whether the water in tank 63 is frozen or available for injection. In some embodiments, an engine coolant passage (not shown) may be thermally coupled with storage tank 63 to thaw frozen water. The level of water stored in water tank 63, as identified by water level sensor 65, may be communicated to the vehicle operator. For example, a water gauge or indication on a vehicle instrument panel (not shown) may be used to communicate the level of water. If the level of water in the water tank 63 is higher than a threshold level, it may be inferred that there is sufficient water available for supply to the coolant reservoir 15, and accordingly water supply may be enabled by the controller, as needed. Else, if the level of water in the water tank 63 is lower than the threshold level, it may be inferred that there is insufficient water available for injection, and therefore water supply may be disabled by the controller until the tank 63 is refilled. Water from the on-board water collection system 60 may also be used for water injection to the engine.

In the depicted embodiment, water storage tank 63 may be automatically refilled by the collection system 72 via water tank filling passage 76. Also, the water storage tank 63 may be manually refilled via water filling passage 69. Collection system 72 may be coupled to one or more vehicle components 74 so that the water storage tank can be refilled on-board the vehicle with condensate collected from various engine or vehicle systems. In one example, collection system 72 may be coupled with an EGR system and/or exhaust system to collect water condensed from exhaust passing through the system. In another example, collection system 72 may be coupled with an air conditioning system (not shown) for collected water condensed from air passing through an evaporator. In yet another example, collection system 72 may be coupled with an external vehicle surface (such as door seal channels in the door) to collect rain or atmospheric condensation. A funnel may be positioned under a cup holder in the vehicle cabin to allow recovery of water spills occurring in a container positioned at the cup holder. Further, water may be collected from the charge air cooler 118 and other colder parts of the intake system where water condensation may take place. Water may be collected from an on-board fuel cell and components of the exhaust system such as from an exhaust heat exchanger. Also, water may be recovered from fuel. As an example, as fuel is routed to the fuel tank, a mass centrifugal water separator may be used to remove water from the fuel and this water may be routed to the water storage tank 63. Manual filing of water may be possible via a manual filling passage 69 fluidically coupled to a filter 68, which may remove some impurities contained in the water.

Each of the vehicle components 74 from which water may be recovered may include a reservoir or a tray for collecting the water. Each reservoir or tray of the vehicle components 74 may be coupled to the water storage tank 63 via water recovery lines which may further comprise individual pumps. In one example, each reservoir or tray of the vehicle components 74 may be positioned at a higher elevation relative to the water storage tank 63 to allow water to flow to the water storage tank 63 by the force of gravity without the requirement of additional pumps. There may be one or more filters in the water recovery system 60 to remove impurities from the water entering the water storage tank 63. Water level sensors and pressure sensors may be coupled to each of the reservoirs or trays. Clogging in filters and/or leakages in the reservoirs may be detected based on inputs from the pressure sensor. As an example, an unexpected increase in water pressure may be observed in one or more reservoirs when the filter corresponding to the reservoir is clogged. A reverse flow pump may be included in the water line coupling each of the reservoirs to the water storage tank 63. The reverse flow pump may be operated to reverse the direction of water flow through the water line to clean the filter and purge the line. Once the water lines have been cleaned and purged, the water from the tank 63 may be drained and refilling of water may be initiated.

A drain 92 including a drain valve 91 may be used to drain water from the water storage tank 63 to a location outside the vehicle (e.g., onto the road), such as when a quality of the water is deemed to be lower than a threshold and not suitable for supply to the coolant reservoir (e.g., due to high conductivity, high particulate matter content). In order to reduce the possibility of water freezing in the tank 63, water may be drained from the tank 63 during conditions when water temperature in the tank 63 is predicted to be below freezing point. If the vehicle engine is shut-down for a prolonged period of time during cold ambient conditions, the water from the tank 63 may be drained to reduce the possibility of freezing. In one example, engine coolant may be circulated around the water tank 63 or the water tank 63 may be insulated using a phase change material in order to reduce freezing of the water in the tank 63. During cold conditions, the phase change material may supply heat to the water tank 63 to maintain water temperature above the freezing point. Also, for electric hybrid vehicles, during colder ambient conditions, the water tank 63 may be externally heated by passing electric current through the walls of the tank 63 when the vehicle is plugged in.

As such, the quality of the water may be assessed based on the output of conductivity sensor 93 coupled to the on-board water collection system 60, in water line 161. In other examples, sensor 93 may be a capacitance sensor, optical sensor, turbidity sensor, density sensor, or some other type of water quality sensor. In this way, if a water level in the water tank 63 is higher than a first threshold or if a predicted water temperature is lower than a freezing temperature, at least a portion of water from the water tank may be drained, and if the water level in the water tank is lower than a second threshold, the water tank may be refilled with water collected from the one or more vehicle systems, the first threshold higher than the second threshold.

In order to maintain optimal functionality of the engine coolant system, the coolant level in the coolant reservoir may be maintained above a threshold level. The coolant may comprise a substantially 50-50 mixture of water and glycol. As the coolant is circulated through engine components to regulate engine temperature, over time, due to evaporation, the water content of the coolant may reduce and also there may be an overall reduction in the coolant level and an increase in the relative glycol amount (to more than 50%) in the coolant. The coolant level in the coolant reservoir 15 may be estimated via the float sensor 16. In response to a lower than threshold coolant level in the coolant reservoir, irrespective of the relative glycol amount in the coolant, water may be supplied from the water tank 63 to the coolant reservoir 15 until the coolant level increases to the threshold level. Supplying water from the water tank to the coolant reservoir includes supplying water via a flow regulator valve 163 and a water line 161, an opening of the flow regulator valve 163 adjusted based on a demand for water supply to the coolant reservoir, the opening increased with an increase in the demand for water supply.

Chemical imbalance of the coolant and a higher level of glycol in the coolant may result in engine system over heating and engine degradation. In one example, the relative glycol amount (such as glycol percentage) in the coolant may be directly measured via a dedicated glycol level sensor 17. In another example, the glycol percentage may be estimated from the coolant level in the reservoir. If it is inferred that the percentage of glycol in the coolant is higher than the desired 50% (first higher threshold), an amount of water may be added to the coolant reservoir 15 such that the water glycol chemical balance is restored. The amount of water to be added may be based on the difference between the actual relative glycol amount and the desired relative glycol amount. The water may then be added to the coolant reservoir 15 from the water storage tank 63 via the water line 161 until the relative amount of glycol in the engine coolant decreases to the threshold amount. An example method for maintaining a water glycol balance in the coolant system is discussed with relation to FIG. 2. In one example, in response to the relative amount of glycol in the engine coolant being lower than a lower second threshold amount, a diagnostic code may be set indicating the operator to externally supply glycol to the coolant reservoir to increase the relative glycol amount in coolant to the threshold amount.

FIG. 1 further shows a control system 28. Control system 28 may be communicatively coupled to various components of engine system 100 to carry out the control routines and actions described herein. Control system 28 may include an electronic digital controller 12. Controller 12 may be a microcomputer, including a microprocessor unit, input/output ports, an electronic storage medium for executable programs and calibration values, random access memory, keep alive memory, and a data bus. Controller 12 may receive input from a plurality of sensors 30, such as the various sensors of FIG. 1, to receive input including transmission gear position, accelerator pedal position, brake demand, vehicle speed, engine speed, mass airflow through the engine, boost pressure, ambient conditions (temperature, pressure, humidity), etc. Other sensors include water storage level sensor 65, water temperature sensor 67, conductivity sensor 93, coolant level sensor 16, glycol level sensor 17, coolant temperature sensor 127, CAC 118 sensors, such as CAC inlet air temperature, ACT sensor 125, exhaust pressure and temperature sensors 80, 82, and pressure sensor 124, CAC outlet air temperature sensor, and MCT sensor 23, knock sensor 183 for determining ignition of end gases and/or water distribution among cylinders, and others. The controller 12 receives signals from the various sensors of FIG. 1 and employs the various actuators of FIG. 1 such as a flow regulator valve 163, EGR valve 152, etc. to adjust engine operation based on the received signals and instructions stored on a memory of the controller. In one example, the controller may estimate a coolant level in the coolant reservoir 15 via inputs from the coolant level (float) sensor 16 and based on a lower than threshold coolant level, the controller may send a signal to the actuator coupled to the flow regulation valve 163 to allow water to be supplied to the coolant reservoir 15 from the water storage tank 63 until the coolant level increases to the threshold coolant level. In some examples, the storage medium may be programmed with computer readable data representing instructions executable by the processor for performing the methods described below (e.g., at FIG. 2) as well as other variants that are anticipated but not specifically listed.

In this way, the system of FIG. 1 provides for a vehicle system comprising: an engine, an engine coolant system including a coolant reservoir, an on-board water collection system including a water tank, a water lift pump, a regulator valve, and a water line coupling the water tank to the coolant reservoir, a float sensor and a glycol sensor coupled to the coolant reservoir, a water quality sensor and a water level sensor coupled to the water tank, an air conditioning system including an evaporator and a first reservoir coupled to the water tank of the on-board water collection system, an exhaust gas recirculation system including a cooler and a second reservoir coupled to the water tank of the on-board water collection system, an engine intake system including a charge air cooler and a third reservoir coupled to the water tank of the on-board water collection system, and a controller with computer readable instructions stored on non-transitory memory for: inferring a relative glycol amount in coolant based on inputs from the glycol sensor, and in response to a higher than first threshold relative glycol amount, supplying water from the water tank to the coolant reservoir until the glycol percentage decreases to the threshold percentage, and in response to a lower than second lower threshold relative glycol amount, indicating a lower than threshold glycol amount by setting a diagnostic code.

Figure 2:
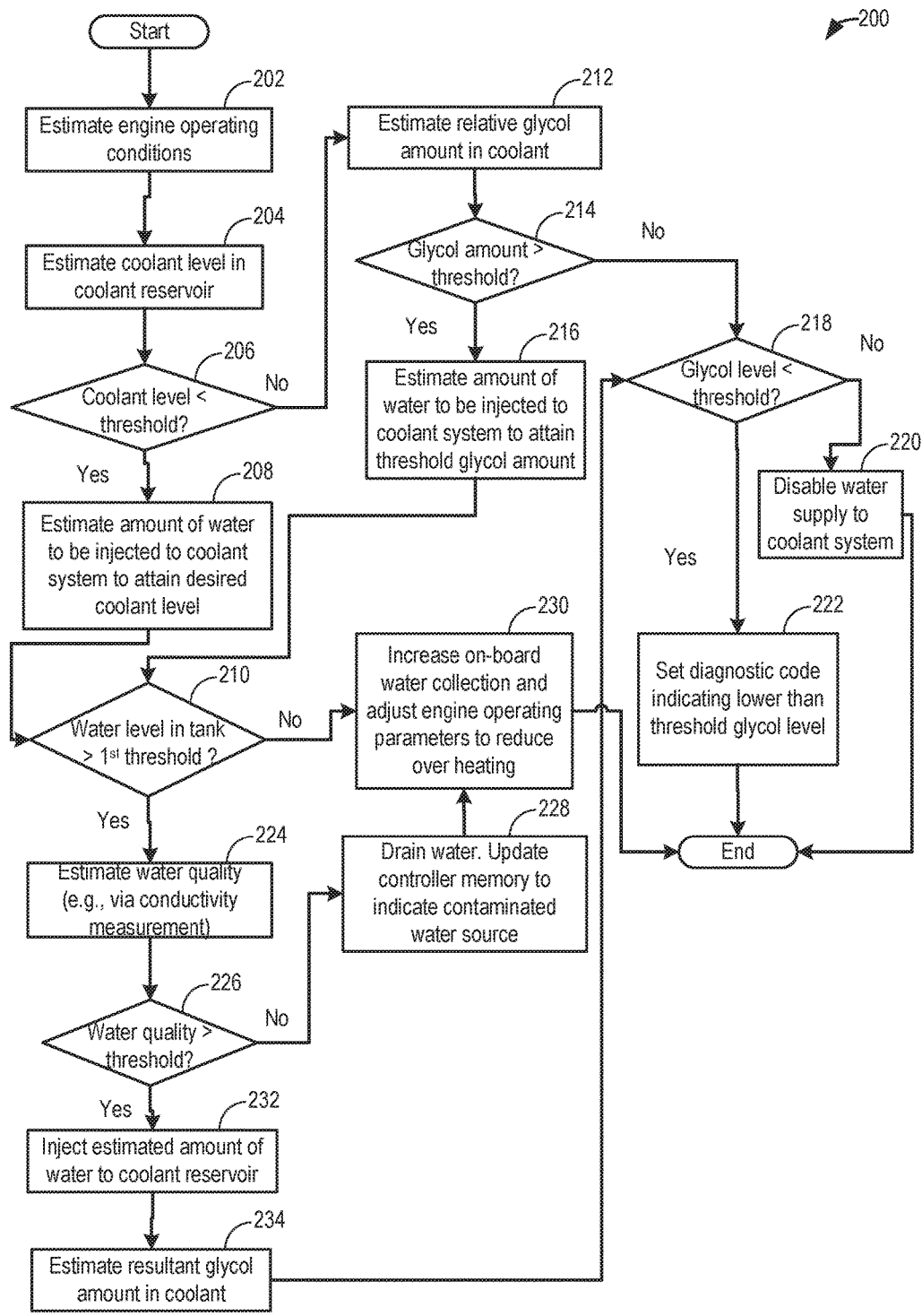
FIG. 2 shows a flow chart illustrating an example method that may be implemented for maintaining a coolant level and a relative glycol amount in the coolant system.
Figure 3:
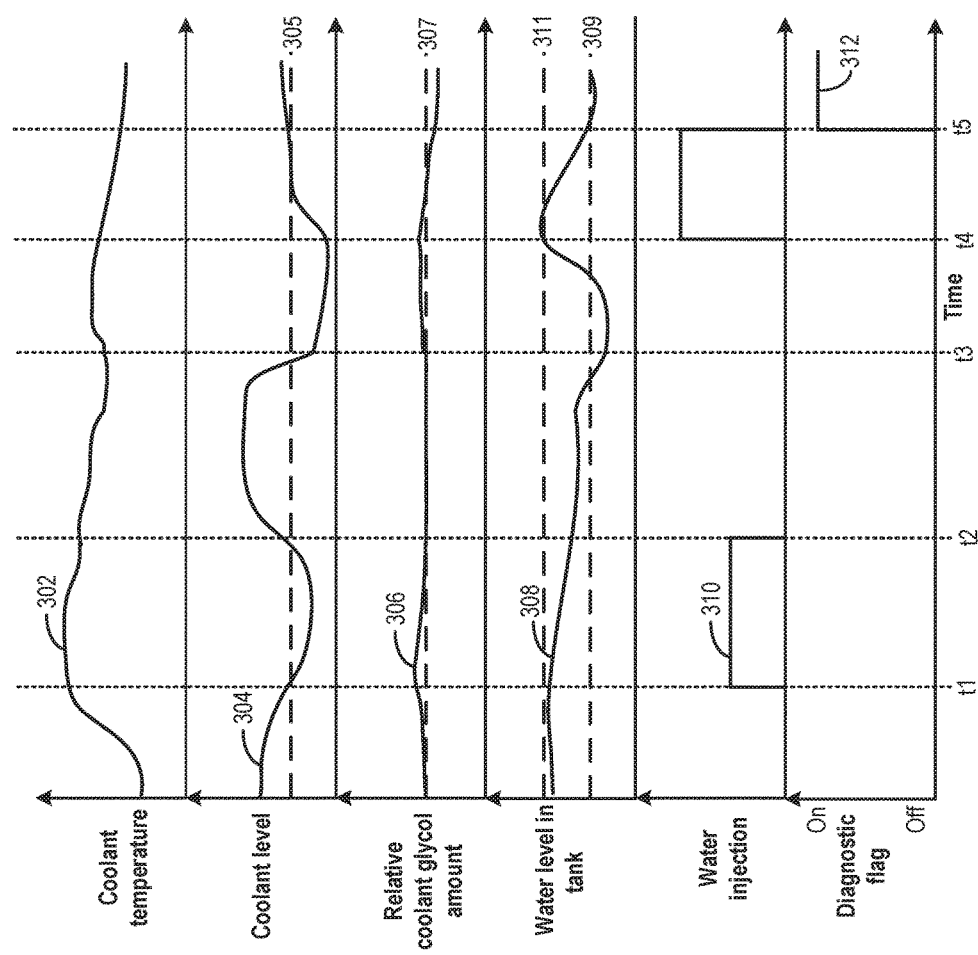
FIG. 3 shows an example maintenance of a coolant level and a relative glycol amount in the coolant system, according to the present disclosure.

FIG. 2 illustrates an example method 200 that may be implemented for maintaining a desired coolant level and a water glycol balance in an engine coolant system. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the routine includes estimating and/or measuring engine operating conditions. Conditions assessed may include, for example, driver demand, engine temperature, engine load, engine speed, exhaust temperature, ambient conditions including ambient temperature, pressure, and humidity, manifold pressure and temperature, boost pressure, exhaust air/fuel ratio, etc. Also, ambient conditions such as ambient temperature, humidity, etc. may be measured.

At 204, a coolant level in a coolant reservoir (such as coolant reservoir 15 in FIG. 1) of the engine coolant system may be estimated based on inputs from a float sensor (such as float sensor 16 in FIG. 1) coupled to the coolant reservoir. Also, the controller may determine the coolant level in the coolant reservoir based on input from a coolant temperature sensor. If the coolant temperature is different from the expected coolant temperature based on engine operating conditions, it may be inferred that the coolant level is lower than the expected coolant level.

At 206, the routine includes determining if the coolant level in the coolant reservoir is lower than a threshold level. The threshold level may correspond to the level of coolant required in the coolant system to reduce engine overheating and improve engine performance. As coolant is circulated through heated engine components, water in the coolant may evaporate, thereby causing a decrease in the total coolant level of the coolant system. Further leaks in the coolant system may lead to loss in coolant and a lowering of the coolant level to below the threshold level.

If it is determined that the coolant level in the coolant reservoir is higher than or equal to the threshold level, it may be inferred that the coolant in the coolant reservoir is at the desired level for optimal performance of the coolant system. At 212, a relative glycol amount in the coolant may be estimated via a distinct glycol level sensor coupled to the coolant reservoir. A coolant may originally comprise 50% water and 50% glycol. As water is lost from the circulating coolant, the glycol content in the coolant may increase. Also, glycol may be lost due to leakages in the coolant system.

In one example, during conditions when there is loss in coolant water content (such as due to evaporation), the amount of glycol in the coolant may be estimated based on the coolant level by using equations 1-4.

$$G_{old} = \frac{y}{x_{old} + y} \times 100 \quad (1)$$

$$G_{new} = \frac{y}{x_{new} + y} \times 100 \quad (2)$$

$$x_{new} = x_{old} - C_{loss} \quad (3)$$

$$C_{loss} = C_{old} - C_{new} \quad (4)$$

where, $G_{old}$ is the original percentage of glycol in the coolant (before any loss in coolant water content), $x_{old}$ is the original amount of water in the coolant, y is the original amount of glycol in the coolant, $G_{new}$ is the current percentage of glycol in the coolant (after loss in coolant content), $x_{new}$ is the current amount of water in the coolant, $C_{loss}$ is the amount of coolant lost during engine operation, $C_{old}$ is the original amount of coolant in the coolant reservoir, and $C_{new}$ is the current amount of coolant in the coolant reservoir.

At 214, the routine includes determining if the relative glycol amount is higher than a threshold glycol amount. In one example, the relative amount of glycol in the engine coolant is a percentage of glycol in the engine coolant as estimated via a glycol sensor coupled to the coolant reservoir, and the threshold amount of glycol is 50%. In another example, the relative amount of glycol in the engine coolant is a fraction of glycol in the engine coolant, and the threshold amount of glycol is 0.5. If it is determined that the glycol level is not higher than the threshold level, the routine proceeds to 218 to determine if the glycol level is lower than the threshold level. If it determined that the glycol level is not lower than the threshold level, it may be inferred that the relative glycol amount is substantially equal to the threshold level and at 220, water supply to the coolant system for glycol level adjustment may be disabled.

However, if it is determined that the glycol level in coolant is lower than the threshold, it may be inferred that glycol needs to be added to the coolant reservoir to maintain the water glycol balance in the coolant system. At 222, a diagnostic code (such as flag) may be set indicating a lower than threshold glycol level in the coolant. The diagnostic code may send a notification to the vehicle operator to externally supply glycol to the coolant reservoir in order to improve coolant system performance. Setting the diagnostic code is in response to the relative amount of glycol in the engine coolant being lower than the threshold amount irrespective of the engine coolant level. As such, the diagnostic code may be set even when the coolant level is above the threshold coolant level. In one example, the relative amount of glycol in the coolant may be compared to each of a first threshold and a second threshold, the first threshold higher than the second threshold, and if the glycol amount is in between the first threshold and the second threshold (lower than first threshold but higher than second threshold), the diagnostic flag may not be set as the reduced glycol level may not substantially affect the operation of the coolant system. However, if the relative glycol amount is lower than the second threshold, the diagnostic code may be set indicating requirement of external supply of glycol. If it is determined at 214, that the glycol level in coolant in greater than the threshold, at 216, the controller may determine the amount of water that may be added to the coolant to dilute the coolant and in turn reduce the relative glycol amount in the coolant to the threshold amount. In one example, the amount of water to be injected to the coolant reservoir may be estimated using equation 5.

$$W_1 = 2(G_{old} - G_{new}) \quad (5)$$

Where $W_1$ is the amount of water to be injected to the coolant reservoir to restore the water glycol balance, $G_{new}$ is the current amount of glycol in the coolant and $G_{old}$ is the threshold amount of glycol in the coolant. As such, $G_{old}$ may be 50% of the total amount of coolant.

In this way, a glycol content in coolant may be estimated via a glycol sensor coupled to the coolant reservoir, in response to a higher than first threshold relative glycol amount in the coolant, water may be supplied from the water tank to the coolant reservoir until the relative glycol amount in the coolant decreases to the threshold percentage while not notifying an operator, and in response to a lower than second lower threshold relative glycol amount in the coolant, an operator may be notified for external glycol supply, the first threshold relative glycol amount higher than the second threshold relative glycol amount.

If at 206, it is determined that the coolant level in the coolant reservoir is lower than the threshold coolant level, at 208, the controller may determine the amount of water that may be added to the coolant to increase the coolant level in the reservoir to above the threshold level and to restore the water-glycol balance in the coolant. In one example, the amount of water to be injected may be equal to the amount of coolant lost during engine operation, $C_{loss}$.

Once the amount of water to be injected is determined for increasing the coolant level to the threshold level and/or for attaining the threshold glycol amount in the coolant (as determined in steps 208 and 216), the routine moves to 210 to determine if the water level in a water tank or reservoir of an on-board water collection system is higher than a first threshold level, such as above 10% of capacity. If it is determined that the water level in the water tank is lower than the threshold, it may be inferred that there may not be sufficient water to be added to the coolant reservoir for attaining a desirable coolant level and coolant water glycol balance.

In response to the lower than first threshold water level in the tank, at 230, on-board collection of water from one or more vehicle systems such as condensate from one or more components, such as an EGR cooler, a charge air cooler, an AC evaporator, an exhaust heat exchanger, and a vehicle external surface may be increased. The water tank may be refilled until the water level in the tank reaches a second threshold level, the second threshold higher than the first threshold. Refilling the water tank includes routing water from each of the one or more reservoirs to the water tank. As elaborated with reference to the system of FIG. 1, the water reservoir may be refilled with, as non-limiting examples, water condensed from exhaust passing through an EGR system, and water condensed from air passing through an evaporator of a vehicle air conditioning system. In one example, water from one or more reservoirs coupled to each of the water recovery system, (such as AC system, EGR system, exhaust system, etc.) may be routed to the water tank of the on-board water recovery system via operation of one or more pumps. The controller may send a signal to the actuators coupled to one or more pumps of the on-board water recovery system to operate the pumps in order to flow water collected in each of the reservoirs to the water tank. In one example, the controller may prioritize the water collection from one or more engine systems based on engine operating conditions and the amount of water available at the individual reservoir of each system. In one example, if the AC system is operational, the controller may first recover the condensate from the AC system and route it to the water tank. In another example, if the AC system is not operating, and EGR is being supplied to the engine, the controller may first recover water condensed at the EGR cooler and supply it to the water tank. In yet another example, during higher than threshold ambient humidity (such as during rain), water may be first collected from the vehicle external surface and routed to the water tank. In a further example, the controller may estimate the amount of water stored in each of the reservoirs coupled to each of the water recovery systems, and may first route water to the water tank from the reservoir with the highest water content. In this way, on-board water collection may be increased and prioritized based on the amount of water desired and vehicle operating conditions. Also, manual refill of the water tank may be requested.

As the water tank is being refilled, in response to a lower than threshold coolant content in the coolant reservoir, engine operating parameters may be adjusted to reduce the possibility of overheating caused due to the lower level of coolant in the cooling system. In one example, if the engine temperature increases to above a threshold temperature, engine speed may be reduced to limit further rise in engine temperature. Additionally, injections of fuel may be partially reduced in a "round-robin" fashion to further limit the rise in engine temperature.

If it is determined that the water level in the water tank is higher than the threshold level, at 224, the method includes estimating the quality of the water in the water reservoir. As such, the nature of contaminants present in the water, as well as the degree of contamination may vary widely based on the source of water used for refilling the water tank. As an example, if water was obtained from external vehicle surface (such as door seal channels in the door), there may be a higher level of contaminants present. Also, it may be recommended to refill the water tank with distilled water, but the operator may refill with tap water or well water instead. As such the different sources of water may contain different types and amounts of minerals and other contaminants that may cause deposits on water filters, water injectors, engine components, exhaust catalysts, etc. In one example, the quality of the water in the water tank may be estimated based on the output of a water quality sensor coupled to the water reservoir, the water quality estimate based on a conductivity value or ionic strength of the water (such as sensed via a conductivity sensor). In alternate examples, the quality of the water may be estimated based on an ionic strength of the water, a particle matter content, a turbidity sensor, a density sensor, a refraction index, etc.

In still other examples, the water quality may be inferred based on the water refilling location using knowledge of the vehicle's location (such as based on GPS data, location of nearby WiFi hotspots, etc.) combined with knowledge of the local water quality at that location (such as determined on-board or retrieved from a database, such as an internet database of water quality for city water systems and ground water). If the water quality value was inferred or retrieved from a remote location, the controller may additionally refine the data with previous history of contamination detected after refilling at the same location (as elaborated below). The history may be based on data collected on-board the given vehicle, or collected on-board an alternate vehicle and retrieved through vehicle-to-vehicle (V2V) or vehicle-to-infrastructure communication. In one example, the quality of the water may be given an index value, or a rating number.

At 226, the estimated water quality (e.g., the index value or rating number or conductivity value) is compared to a threshold which depends on the water quality sensor being used. For example, a lower reading on a turbidity sensor may be given a high water quality index value, and turbidity readings of less than 5 NTU may correspond to water quality index values higher than the threshold. The threshold may correspond to a minimum water quality level required to enable water supply to the coolant reservoir without compromising engine cooling system performance.

If the estimated quality of the water is lower than the threshold, then at 228, the method includes draining the water from the water reservoir, such as by opening a solenoid controlled drain valve coupling the water reservoir to a drain pipe that releases the water to a location outside the vehicle. The water may be fully or partially drained, the selection based on the level of contamination of the water and/or based on predictions of future water refills, water consumption rates, and water condensate collection rates. In one example, if draining of the water added to the reservoir is selected, the controller may close the vehicle refill tank cap or close a valve coupled in front of a tank inlet, while diverting the incoming water to a drain.

In addition, if the water was refilled at a location off-board the vehicle, a memory of the controller may be updated, with GPS coordinate information of the location, to indicate that the source of the water was contaminated. Further, the controller may limit access to a refill port/cap of the water tank based on the indication of water contamination. As a result, future water reservoir manual refills from that location may be limited, or at least temporarily disabled. In one example, an access door to the water tank refill port may be configured with a locking mechanism that is opened through a user interface, in a vehicle cabin space, in communication with the controller. The controller may issue location-based indications (e.g., warning beeps, or lights or messages displayed on a vehicle display on a center-console) when the local tap water or well water contamination level exceeds the threshold level based on a predicted risk of contamination. The controller may ask the vehicle operator to confirm that they are refilling with the appropriate water (e.g., distilled water) by pressing a button or saying "yes" before allowing the water tank refill door to open.

If the water quality is higher than the threshold, at 232, the estimated amount of water may be supplied from the water tank of the on-board water collection system to the coolant reservoir of the coolant system via one or more water lines, a water lift pump, and a flow regulator valve in order to increase the coolant level to above the threshold level and/or to decrease the relative glycol amount to the threshold amount. The controller may send a signal to an actuator coupled to the flow regulator valve to adjust the opening of the flow regulator valve based on the estimated amount of water to be supplied. In one example, the opening may be increased with an increase in the amount of water to be supplied and the opening may be correspondingly decreased with a decrease in the amount of water to be supplied. Also, the controller may send a signal to the actuator of the motor of the water lift pump to adjust the duration of operation of the pump based on the estimated amount of water to be supplied. The controller may determine the duration of pump operation through a determination that directly takes into account a determined amount of water to be injected, such as increasing the duration of pump operation with increasing amount of water to be injected. The controller may alternatively determine the duration of pump operation based on a calculation using a look-up table with the input being the amount of water to be injected and the output being the duration of pump operation. In this way, a quality of the water in the water tank may be estimated based on a water quality sensor; if the estimated quality is higher than a threshold, water may be supplied to the coolant reservoir based on demand; and if the estimated quality is lower than a threshold, the water from the water tank may be drained.

Once water injection to the coolant reservoir is complete, at 234, the resultant relative glycol amount in the coolant may be measured based on inputs from the glycol level sensor. As such, water injection for increasing the coolant level to above the threshold coolant level may result in over dilution of the coolant, resulting in a decrease in the relative glycol content in the coolant. Therefore, the routine may proceed to 218 wherein it may again be determined if the new glycol amount is lower than the threshold amount. In response to a lower than threshold relative glycol amount in the coolant, the operator may be notified by setting a diagnostic code that external supply of glycol is requested to improve the performance of the engine coolant system. In this way, after supplying water to the coolant reservoir, the relative glycol amount in the engine coolant may be estimated, and in response to a lower than threshold glycol amount, a diagnostic code may be set.

In this way, in response to a lower than threshold coolant level in a coolant reservoir, water may be supplied from a water tank of an on-board water collection system to the coolant reservoir until a coolant level in the coolant reservoir increases to the threshold level, and in response to a lower than first threshold water level in the water tank, water from one or more water reservoirs coupled to one or more vehicle systems may be supplied to the water tank until a water level in the water tank increases to above a second threshold water level, the second threshold higher than the first threshold.

FIG. 3 shows an example operating sequence 300 illustrating maintenance of a coolant level and a relative glycol amount in an engine coolant using water from an on-board water recovery system. The horizontal (x-axis) denotes time and the vertical markers t1-t5 identify significant times in the maintenance schedule of the coolant system.

The first plot, line 302, shows a variation in coolant temperature over time, as inferred based on inputs from an engine coolant temperature sensor. The second plot, line 304, shows a variation in coolant level in the coolant reservoir over time, as inferred based on inputs from a coolant level sensor. Dotted line 305 represents a threshold coolant level below which water is requested to be added to the coolant reservoir to improve functionality of the engine coolant system. The third plot, line 306, shows a change in a relative glycol amount in the coolant, as inferred based on inputs from a glycol level sensor. Dotted line 307 represents a threshold glycol amount in the engine coolant that is desired to be maintained for optimal operation of the coolant system. The fourth plot, line 308, shows a level of water in the water tank of the on-board water recovery system, as inferred based on inputs from a water level sensor. Dotted line 309 represents a first threshold water level, below which water may not be supplied to the coolant reservoir. Dotted line 311 represents a second threshold water level, above which water supply to the coolant reservoir may be suspended. The fifth plot, line 310, shows a level of water injected (supplied) from the water tank of the on-board water recovery system to the coolant reservoir. The fifth plot, line 312, shows a position of a diagnostic flag indicating requirement for external addition of glycol to the coolant reservoir.

Prior to time t1, the coolant temperature gradually increases causing water present in the coolant to evaporate. Consequently, it is observed that water evaporation causes the coolant level to reduce. As water evaporates, the relative glycol amount or percentage in the coolant may increase to above the threshold amount. For optimal performance of the coolant system, the relative glycol amount in the coolant may be maintained at 50%. During this time, the coolant level 304 in the coolant reservoir is above the threshold 305 and water injection from the water tank to the coolant reservoir is not carried out. Since the coolant level is above the threshold level, the diagnostic flag is maintained in the off position (no indication to operator).

At time t1, it is observed that the coolant level 304 in the coolant tank has decreased to below the threshold 305 and relative glycol amount 306 in coolant has increased to above the threshold 307. In response to the decrease in the coolant level and the increase in the relative glycol amount, between time t1 and t2, water from the water tank is supplied to the coolant tank via a water line, a water lift pump, and a flow regulator valve. As the water is routed from the water tank, the water level in the water tank decreases while the coolant level in the coolant tank increases. Also, the dilution (water content) of the coolant increases, the relative glycol amount in the coolant decreases.

At time t2, it is observed that the coolant level in the coolant reservoir has increased to above the threshold 305 and also, the relative glycol amount in coolant has decreased to the threshold amount 307. In response to the increase in coolant level and the decrease in the relative glycol amount, further water supply from the water tank to the coolant reservoir is suspended. Between time t2 and t3, the coolant level continues to remain above the threshold level 305 and the relative glycol amount remains at the threshold amount 307. The water in the water tank is used in other system systems such as for water injection to the engine and the water level in the tank decreases.

At time t3, it is observed that the coolant level in the coolant tank has decreased to below the threshold 305 and relative glycol amount in coolant has increased above the threshold 307. However, at this time, the water level in the water tank is below the threshold 309 and water from the tank cannot be supplied to the coolant tank for increasing the coolant level. Between time t3 and t4, water collection from one or more vehicle systems is increased to refill the tank and increase the water level in the tank to above the threshold. In response to the lower than threshold water level in the water tank, on-board water collection is increased by one or more of collecting condensate from the evaporator of the air conditioning system in a first reservoir, collecting condensate from the cooler of the exhaust gas recirculation system in a second reservoir, and collecting condensate from the charge air cooler of the engine intake system in a third reservoir, and then supplying water collected in each of the first reservoir, the second reservoir, and the third reservoir to the water tank. As the on-board water recovery increases from a plurality of vehicle systems, the water level in the water tank gradually increases.

At time t4, it is observed that the water level in the water tank has increased to above the second threshold 311 and water supply to the coolant reservoir is initiated. Relative to the demand for water at time t1, the demand for water at this time t4 is higher due to a grater reduction in coolant level. Therefore, the amount of water injected between time t4 and t5 is higher than the amount of water injected between time t1 and t2.

At time t5, it is observed that the coolant level has increased to above threshold 305. However, it is inferred that due to the addition of water, the relative glycol amount in the coolant decreases to significantly below the threshold 307 by more than a threshold amount (not shown) and glycol needs to be externally added to the coolant tank to restore the water glycol chemical balance. Therefore, at time t5, a diagnostic flag (code) may be turned on to notify the operator regarding the requirement of external glycol supply.

In this way, a water level and a relative glycol amount may be maintained in an engine coolant by using water sourced from one or more on-board vehicle systems.

One example method comprises, in response to a relative amount of glycol in an engine coolant being higher than a threshold amount, and/or in response to an engine coolant level being lower than a threshold coolant level, supplying water from an on-board water collection system to a coolant reservoir; and in response to the relative amount of glycol in the engine coolant being lower than the threshold amount, setting a diagnostic code. In the preceding example, additionally or optionally, supplying water from the on-board water collection system includes supplying water from a water tank of the on-board water collection system to the engine coolant reservoir until the engine coolant level increases to the threshold coolant level, and wherein setting the diagnostic code is in response to the relative amount of glycol in the engine coolant being lower than the threshold amount irrespective of the engine coolant level. Any or all of the preceding examples further comprising, additionally or optionally, after supplying water to the coolant reservoir, estimating the relative glycol amount in the engine coolant, and in response to a lower than threshold glycol amount, setting the diagnostic code. In any or all of the preceding examples, additionally or optionally, supplying water from the on-board water collection system to the coolant reservoir further includes supplying water to the engine coolant reservoir until the relative amount of glycol in the engine coolant decreases to the threshold amount. In any or all of the preceding examples, additionally or optionally, the relative amount of glycol in the engine coolant is a percentage of glycol in the engine coolant as estimated via a glycol sensor coupled to the coolant reservoir, and wherein the threshold amount of glycol is 50%. In any or all of the preceding examples, additionally or optionally, the on-board water collection system sources water from one or more vehicle system including an on-board air-conditioning system, an exhaust gas recirculation system, an exhaust system, and an air intake system. In any or all of the preceding examples, additionally or optionally, each of the one or more vehicle systems include one or more reservoirs and refilling the water tank includes routing water from each of the one or more reservoirs to the water tank. Any or all of the preceding examples further comprising, additionally or optionally, collecting condensate from an evaporator of the on-board air conditioning system in a first water reservoir, and then routing water from the first water reservoir to the water tank via water lines. Any or all of the preceding examples further comprising, additionally or optionally, collecting rain water and atmospheric condensate from an external vehicle surface, and routing the water to the water tank, wherein the external vehicle surface includes door seal channels. Any or all of the preceding examples further comprising, additionally or optionally, estimating a quality of the water in the water tank based on a water quality sensor; if the estimated quality is higher than a threshold, supplying the water to the coolant reservoir based on demand; and if the estimated quality is lower than a threshold, draining the water from the water tank. Any or all of the preceding examples further comprising, additionally or optionally, if a water level in the water tank is higher than a first threshold or if a predicted water temperature is lower than a freezing temperature, draining at least a portion of water from the water tank, and if the water level in the water tank is lower than a second threshold, refilling the water tank with water collected from the one or more vehicle systems, the first threshold higher than the second threshold.

Another example engine method comprises: in response to a lower than threshold coolant level in a coolant reservoir, supplying water from a water tank of an on-board water collection system to the coolant reservoir until a coolant level in the coolant reservoir increases to the threshold level, and in response to a lower than first threshold water level in the water tank, supplying water from one or more water reservoirs coupled to one or more vehicle systems to the water tank until a water level in the water tank increases to above a second threshold water level, the second threshold higher than the first threshold. The preceding example further comprising, additionally or optionally, estimating a glycol content in coolant via a glycol sensor coupled to the coolant reservoir, in response to a higher than first threshold relative glycol amount in the coolant, supplying water from the water tank to the coolant reservoir until the relative glycol amount in the coolant decreases to the threshold percentage while not notifying an operator, and in response to a lower than second lower threshold relative glycol amount in the coolant, notifying an operator for external glycol supply, the first threshold relative glycol amount higher than the second threshold relative glycol amount.

In any or all of the preceding examples, additionally or optionally, supplying water from the water tank to the coolant reservoir includes supplying water via a flow regulator valve and a water line, an opening of the flow regulator valve adjusted based on a demand for water supply to the coolant reservoir, the opening increased with an increase in the demand for water supply. In any or all of the preceding examples, additionally or optionally, supplying water from the water tank to the coolant reservoir further includes, estimating a water quality in the water tank via a conductivity sensor, in response to a higher than threshold water quality, opening the flow regulator valve to supply water to the coolant reservoir, and in response to a lower than threshold water quality, opening a drain valve to drain water from the water tank. In any or all of the preceding examples, additionally or optionally, the one or more vehicle systems include an engine intake system comprising a charge air cooler, condensate from the charge air cooler is collected in one of the one or more water reservoirs and supplied to the water tank in response to the water level in the water tank reducing to below the first threshold. In any or all of the preceding examples, additionally or optionally, the one or more vehicle systems further include an exhaust gas recirculation system comprising an exhaust gas recirculation cooler, condensate from the exhaust gas recirculation cooler is collected in one of the one or more water reservoirs and supplied to the water tank in response to the water level in the water tank reducing to below the first threshold.

In yet another example, a vehicle system comprises an engine; an engine coolant system including a coolant reservoir; an on-board water collection system including a water tank, a water lift pump, a regulator valve, and a water line coupling the water tank to the coolant reservoir; a float sensor and a glycol sensor coupled to the coolant reservoir; a water quality sensor and a water level sensor coupled to the water tank; an air conditioning system including an evaporator and a first reservoir coupled to the water tank of the on-board water collection system; an exhaust gas recirculation system including a cooler and a second reservoir coupled to the water tank of the on-board water collection system; an engine intake system including a charge air cooler and a third reservoir coupled to the water tank of the on-board water collection system; and a controller with computer readable instructions stored on non-transitory memory for: inferring a relative glycol amount in coolant based on inputs from the glycol sensor; and in response to a higher than first threshold relative glycol amount, supplying water from the water tank to the coolant reservoir until the glycol percentage decreases to the threshold percentage, and in response to a lower than second lower threshold relative glycol amount, indicating a lower than threshold glycol amount by setting a diagnostic code. In the preceding example, additionally or optionally, controller includes further instructions for: in response to a lower than threshold water level in the water tank, increasing on-board water collection by one or more of collecting condensate from the evaporator of the air conditioning system in the first reservoir, collecting condensate from the cooler of the exhaust gas recirculation system in the second reservoir, and collecting condensate from the charge air cooler of the engine intake system in the third reservoir, and then supplying water collected in each of the first reservoir, the second reservoir, and the third reservoir to the water tank. In any or all of the preceding examples, additionally or optionally, the controller includes further instructions for: in response to a lower than threshold coolant level in the coolant reservoir, irrespective of the relative glycol amount in the coolant, supplying water from the water tank to the coolant reservoir until the coolant level increases to the threshold level.

In this way, by continuously monitoring a coolant level in the coolant reservoir of an engine coolant system and opportunistically adding water to the coolant, a desired coolant level may be maintained, thereby reducing a possibility of engine overheating. By supplying water to the coolant responsive to the relative glycol amount in coolant increasing to above a threshold, the water glycol balance in the coolant may be maintained. The technical effect of sourcing water from a plurality of on-board vehicle components such as the air conditioning system for use in the coolant system is that manual refill of water is not required, thereby reducing maintenance costs. Also, by assessing the water quality before adding the water to the coolant system, possibility of contamination of the coolant system may be reduced.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. An engine method, comprising:
in response to a relative amount of glycol in an engine coolant being higher than a threshold amount, and in response to an engine coolant level being lower than a threshold coolant level during increase coolant tem- perature levels, selectively supplying water from an on-board water collection system to a coolant reservoir based on water quality.

2. The method of claim 1, wherein supplying water from the on-board water collection system includes supplying water from a water tank of the on-board water collection system to the engine coolant reservoir until the engine coolant level increases to the threshold coolant level.

3. The method of claim 1, further comprising, adjusting an amount of water injection responsive to coolant level.

4. The method of claim 1, wherein supplying water from the on-board water collection system to the coolant reservoir further includes supplying water to the engine coolant reservoir until the relative amount of glycol in the engine coolant decreases to the threshold amount.

5. The method of claim 1, wherein the on-board water collection system sources water from an on-board air-conditioning system.

6. The method of claim 1, wherein the on-board water collection system sources water from an exhaust gas system.

7. The method of claim 1, wherein the on-board water collection system sources water from an exhaust system, and wherein the collection system includes one or more reservoirs, and refilling the water tank includes routing water from each of the one or more reservoirs to the water tank.

8. The method of claim 5, further comprising, collecting condensate from an evaporator of the on-board air conditioning system in a first water reservoir, and then routing water from the first water reservoir to the water tank via water lines.

9. The method of claim 1, further comprising, collecting rain water and atmospheric condensate from an external vehicle surface, and routing the water to the water tank, wherein the external vehicle surface includes door seal channels.

10. The method of claim 1, further comprising, estimating the quality of the water in the water tank based on a water quality sensor;
if the estimated quality is higher than a threshold, supplying the water to the coolant reservoir based on demand; and
if the estimated quality is lower than a threshold, draining the water from the water tank.

11. The method of claim 1, further comprising, if a water level in the water tank is higher than a first threshold or if a predicted water temperature is lower than a freezing temperature, draining at least a portion of water from the water tank, and if the water level in the water tank is lower than a second threshold, refilling the water tank with water collected from the one or more vehicle systems, the first threshold higher than the second threshold.

12. An engine method, comprising:
in response to a lower than threshold coolant level in a coolant reservoir, supplying water from a water tank of an on-board water collection system to the coolant reservoir until a coolant level in the coolant reservoir increases to the threshold level, and
in response to a lower than first threshold water level in the water tank, selectively supplying water from one or more water reservoirs coupled to one or more vehicle systems to the water tank until a water level in the water tank increases to above a second threshold water level, the second threshold higher than the first threshold responsive to a water quality.

13. The method of claim 12, further comprising, estimating a glycol content in coolant via a glycol sensor coupled to the coolant reservoir, in response to a higher than first threshold relative glycol amount in the coolant, supplying water from the water tank to the coolant reservoir until the relative glycol amount in the coolant decreases to the threshold percentage while not notifying an operator, and in response to a lower than second lower threshold relative glycol amount in the coolant, notifying an operator for external glycol supply, the first threshold relative glycol amount higher than the second threshold relative glycol amount.

14. The method of claim 12, wherein supplying water from the water tank to the coolant reservoir includes supplying water via a flow regulator valve and a water line, an opening of the flow regulator valve adjusted based on a demand for water supply to the coolant reservoir, the opening increased with an increase in the demand for water supply.

15. The method of claim 14, wherein supplying water from the water tank to the coolant reservoir further includes, estimating the water quality in the water tank via a conductivity sensor, in response to a higher than threshold water quality, opening the flow regulator valve to supply water to the coolant reservoir, and in response to a lower than threshold water quality, opening a drain valve to drain water from the water tank.

16. The method of claim 12, wherein the one or more vehicle systems include an engine intake system comprising a charge air cooler, condensate from the charge air cooler is collected in one of the one or more water reservoirs and supplied to the water tank in response to the water level in the water tank reducing to below the first threshold.

17. The method of claim 12, wherein the one or more vehicle systems further include an exhaust gas recirculation system comprising an exhaust gas recirculation cooler, condensate from the exhaust gas recirculation cooler is collected in one of the one or more water reservoirs and supplied to the water tank in response to the water level in the water tank reducing to below the first threshold.

18. A vehicle system, comprising:
an engine;
an engine coolant system including a coolant reservoir;
an on-board water collection system including a water tank, a water lift pump, a regulator valve, and a water line coupling the water tank to the coolant reservoir;
a float sensor and a glycol sensor coupled to the coolant reservoir;
a water quality sensor and a water level sensor coupled to the water tank;
an air conditioning system including an evaporator and a first reservoir coupled to the water tank of the on-board water collection system;
an exhaust gas recirculation system including a cooler and a second reservoir coupled to the water tank of the on-board water collection system;
an engine intake system including a charge air cooler and a third reservoir coupled to the water tank of the on-board water collection system; and
a controller with computer readable instructions stored on non-transitory memory for:
inferring a relative glycol amount in coolant based on inputs from the glycol sensor;
in response to a higher than first threshold relative glycol amount, supplying water from the water tank to the coolant reservoir until the glycol percentage decreases to the threshold percentage, and in response to a lower than second lower threshold relative glycol amount, indicating a lower than threshold glycol amount by setting a diagnostic code; and routing collected water to the water tank based on quality of the collected water.

19. The system of claim 18, wherein the controller includes further instructions for:

in response to a lower than threshold water level in the water tank, increasing on-board water collection by one or more of collecting condensate from the evaporator of the air conditioning system in the first reservoir, collecting condensate from the cooler of the exhaust gas recirculation system in the second reservoir, and collecting condensate from the charge air cooler of the engine intake system in the third reservoir, and then supplying water collected in each of the first reservoir, the second reservoir, and the third reservoir to the water tank.

20. The system of claim 18, wherein the controller includes further instructions for: in response to a lower than threshold coolant level in the coolant reservoir, irrespective of the relative glycol amount in the coolant, supplying water from the water tank to the coolant reservoir until the coolant level increases to the threshold level.

\* \* \* \* \*